United States Patent Office 3,318,831
Patented May 9, 1967

3,318,831
PROCESS FOR PREPARING HIGH SOLIDS
CONCENTRATED LATEX
Kjetil Gauslaa, Sarpsborg, Norway, assignor to Copolymer Rubber & Chemical Corporation, a corporation of Louisiana
No Drawing. Filed Dec. 16, 1963, Ser. No. 330,627
15 Claims. (Cl. 260—29.7)

This invention relates to a novel process for preparing latex, and it further relates to the improved latex thus prepared. In some of its more specific aspects, the invention also relates to a novel direct process for the preparation of synthetic rubber latex having a large average particle size and a distribution of particle size which enables the latex to be concentrated to a high solids content at relatively low viscosity, and to the resulting improved synthetic rubber latex.

The invention may be illustrated and described hereinafter with specific reference to the polymerization of a monomer or a mixture of monomers while dispersed in an aqueous medium under polymerization conditions in the presence of an emulsifying agent and a polymerization catalyst to produce a large particle size synthetic rubber latex which is also characterized by a distribution of particle size that enables it to be concentrated to a high solids content at relatively low viscosity. However, latices of synthetic polymers in general may be prepared in accordance with the teachings of the present invention.

In many industrial processes employing synthetic rubber latex, such as in the manufacture of foamed rubber, it is desirable that the latex have certain properties. One of the more important desirable properties is a high solids content, such as about 60% TSC (total solids content) or higher, and a low viscosity such as less than about 1000 centipoises at 60% TSC. Within reasonable limits, latices having higher solids contents and lower viscosities are more desirable. Another important consideration is the mechanical stability of the latex, and if it does not have a satisfactory mechanical stability, a prohibitive amount of the polymer content may irreversibly coagulate or "prefloc" during handling and storage prior to use. Additionally, the gel time of the latex and the stability of the resulting foam are of importance when the latex is used in the manufacture of foamed rubber.

The viscosity of synthetic rubber latex at a given temperature and solids content is largely determined by the average particle size and the distribution of particle size. It is usually accepted that a large average particle size and a wide, uniform distribution of particle sizes are desirable and result in a lower viscosity latex at a given solids content and temperature. As the solids content is increased or the temperature decreased, then the viscosity increases for a given average particle size and distribution of particle sizes and especially at higher solids contents.

Many attempts have been made to prepare entirely satisfactory low viscosity, high solids synthetic rubber latices which are suitable for foamed rubber manufacture and have all of the above mentioned desirable properties. One difficulty of the prior art has been in providing latex having a sufficiently large average particle size and a proper distribution of particle size to result in low viscosity at a high solids content. One approach to the problem has been to first prepare a low solids, small particle size latex by a fast polymerization recipe, agglomerate the low solids latex to a large average particle size, and then concentrate the agglomerated latex to a desired high solids content. Still another method has been to prepare a high solids latex directly by employing a polymerization recipe calling for a minimum amount of water.

The above mentioned prior art methods of preparing high solids latex have been practiced on a large scale as no entirely satisfactory, inexpensive process has been available heretofore which is capable of growing large polymer particles directly as the latex is produced during the polymerization with the proper distribution of particle size. Therefore, it has been necessary to resort to an expensive agglomeration step prior to concentration of prior art low solids latex such as chemical agglomeration or freeze-thaw agglomeration. Polymerization recipes employing a minimum amount of water also have not been entirely satisfactory. The polymerization mixture passes through a very viscous stage during which production problems invariably occur, the reaction is difficult to control, and there are high power requirements for agitation. Additionally, extremely long reaction times of 40 hours or more are necessary and this has the effect of reducing the capacity of equipment to only a fraction of that which would exist if a fast reaction recipe were available.

The polymerization recipes for high solids latices prepared in accordance with prior art processes often include relatively large amounts of an electrolyte and/or one or more surfactants to stabilize the latex during and subsequent to the polymerization, and the presence of the electrolyte and/or surfactants is detrimental in the preparation of films and foams. Thus, it is also desirable that high solids latex for use in forming films and preparing foamed synthetic rubber have a low emulsifier content and a low electrolyte content but such prior art latices tend to be viscous and/or unstable.

In accordance with one important variant of the invention, it is possible to prepare directly a relatively low solids synthetic rubber latex which is characterized by an extremely large average particle size and a distribution of particle size which enables it to be concentrated to a low viscosity high solids latex. The polymerization step of the invention may be effected in a much shorter period of time than is required for the low water, slow reaction recipes of the prior art and the polymerization recipe and the resulting latex also may have a low soap content and/or electrolyte content when this is desired. Accordingly, latices prepared in accordance with the present invention may be characterized by a combination of desirable properties which have not been found in any one latex heretofore.

It is an object of the present invention to provide a novel process for the polymerization of monomeric materials to produce an improved latex, and to provide the resulting improved latex product.

It is a further object to provide a novel process for the preparation of synthetic rubber latex, and to provide the resulting improved latex.

It is still a further object to provide a novel process for preparing high solids synthetic polymer latex, and to provide the resulting improved high solids latex.

It is still a further object to provide a novel process for preparing low solids synthetic rubber latex characterized by a large average particle size and a distribution of particle size whereby it may be concentrated to a high solids content as produced, and to provide the resulting improved high solids synthetic rubber latex.

Still other objects of the invention and the attendant advantages thereof will be apparent to those skilled in the art upon reference to the following detailed description and the examples.

It has been discovered that a large average particle size latex which is also characterized by a distribution of particle size such that it may be concentrated to a high solids content at low viscosity may be prepared directly from a prior art emulsion polymerization recipe. This may be accomplished by polymerizing a first increment of the monomeric material used in preparing the latex in the presence of a surfactant and polymerization catalyst until a portion of the first increment has been converted to polymer and unreacted monomeric material is absorbed by the polymer particles, and then adding at least one additional increment of the monomeric material to the resulting latex in an amount whereby free monomeric material is present and new polymer particles may be formed with continued polymerization in the presence of free surfactant and the polymerization catalyst. The latex is subjected to sufficiently vigorous agitation to cause agglomeration of polymer particles containing absorbed unreacted monomeric material to thereby produce a relatively large average particle latex and release free surfactant into the aqueous phase of the latex, i.e., surfactant which is capable of acting as an emulsifier for free monomeric material and aiding in forming new emulsified particles. Then, the monomer content of latex containing free unreacted monomeric material, i.e., monomeric material that is not polymerized or absorbed by the polymer particles, may be reacted in the presence of the free surfactant and the polymerization catalyst under relatively mild agitation conditions to thereby produce additional small polymer particles in the latex.

The latex prepared in accordance with the process of the invention may contain some extremely large polymer particles, which may be as large as 150,000 angstroms, a substantial number of polymer particles having a size of at least 10,000–30,000 angstroms, a large average particle size which may be substantially higher than 2500 angstroms and preferably at least 3,000–5,000 angstroms, and sufficient small polymer particles of graduated sizes to improve the packing factor upon concentration to a high solids content. The large average particle size and the unusually wide, uniform distribution of particle size permit the latex to be concentrated, if desired, to an extremely high total solids content without encountering a prohibitively high viscosity.

The recipe to be used in practicing the present invention may be a suitable polymerization recipe of the prior art for the aqueous emulsion polymerization of monomeric material which produces latex of a synthetic polymer upon polymerization while dispersed in an aqueous medium in the presence of a micelle producing surfactant and a polymerization catalyst. Examples of polymerizable monomeric materials include chloroprene, the various 1,3-butadienes such as 1,3-butadiene, methyl-2-butadiene-1,3, piperylene, and 2,3-dimethylbutadiene-1,3. If desired, the monomeric material may be a mixture of a 1,3-butadiene such as 1,3-butadiene with another copolymerizable material which is capable of forming copolymers therewith. For example, the monomeric material may be a polymerizable mixture containing up to 50%, or higher in some instances, of a compound which contains a $CH_2=C=$ group wherein at least one of the disconnected valences is attached to an electroactive group, i.e., a group which substantially increases the electrical dissymmetry or polar character of the molecule. Examples of compounds containing the aforementioned group are the aryl olefins, such as styrene and vinyl naphthalene; the alpha methylene carboxylic acids and their esters, nitriles and amides, such as acrylic acid, methylacrylate, methyl methacrylate, acrylonitrile, methacrylonitrile and methacrylamide; isobutylene; methyl vinyl ether; and methyl vinyl ketone. In some instances, the monomeric material may be a single compound containing a $CH_2=C=$ group or a mixture of such compounds. The polymerizable monomeric materials suitable for practicing the invention may be referred to herein as being selected from the group consisting of chloroprene, conjugated diolefins homopolymerizable to produce polymers and mixtures of conjugated diolefins and monoethylenically unsaturated monomers copolymerizable to produce copolymers, and preferably rubbery homopolymers or copolymers. The preferred monomeric material for many uses is a mixture of butadiene and styrene, and especially mixtures wherein the styrene content is up to about 50% by weight.

The polymerization recipe used in practicing the invention may contain one or more micelle forming surfactants of the same type as employed in prior art emulsion polymerization recipes. Examples of surfactants are the fatty acid soaps and especially water soluble, long chain fatty acid soaps such as sodium or potassium laurate, myristate, palmitate, oleate, stearate, etc. The water soluble sodium or potassium soaps of tall oil and the rosin soaps, including disproportionated rosin soaps, also may be used. If desired, a secondary emulsifier may be present, which may be a prior art synthetic detergent. Examples of secondary emulsifiers include the alkali metal sulfonates derived from aryl sulfonic acids such as sodium alkyl naphthalene sulfonate.

The polymerization recipe also may contain a polymerization catalyst, which likewise may be of a prior art type useful in the emulsion polymerization of the monomeric material. The catalyst may be a free radical initiator, and satisfactory catalysts include organic hydroperoxides such as paramenthane hydroperoxide, cumene hydroperoxide, diisopropyl benzene hydroperoxide, and the like. A prior art activator also may be present in redox combination such as ferrous sulfate or other suitable ionizable heavy metal salts. Additionally, other substances may be present in the recipe in accordance with prior art practice.

It is usually desired to use a minimum amount of surfactant. For instance, it is preferred that the primary emulsifier, which may be a fatty acid soap, be maintained at levels of about 1–3 parts by weight and the secondary emulsifier at about 0–.2 part by weight for each 100 parts by weight of monomer initially present or added as an increment. At such low soap levels and especially in instances where no electrolyte is present or it is maintained at a minimum, the latex has exceptionally outstanding properties for use in the manufacture of foamed rubber articles. The surfactant content preferably should be maintained sufficiently low so that as the polymerization proceeds, the polymerization mixture passes through a viscous stage during which it may be readily agglomerated by intense agitation, followed by a reduction in viscosity and the release of free surfactant into the aqueous phase.

A typical recipe which has been found to be especially useful in practicing the present invention when preparing styrene-butadiene latex is as follows:

| Ingredient: | Parts by weight [1] |
|---|---|
| Butadiene (first increment) | 47 |
| Styrene (first increment) | 20 |
| Butadiene (added increment) | 23 |
| Styrene (added increment) | 10 |
| Potassium oleate | 1–3 |
| Sodium alkyl naphthalene sulfonate | 0–0.2 |
| Diisopropyl benzene hydroperoxide | 0.033 |
| Sodium formaldehyde sulfoxylate | 0.033 |
| Activator solution [2] | 0.5 |
| Sulfole (isopentadecane mercaptan) | 0.1 |
| Tetrasodium salt of ethylenediamine tetraacetate | 0.01 |
| Sodium hydrosulfite | 0.017 |
| Water | 100–150 |

[1] Based on total monomer.
[2] The activator was a solution of 1.27 grams of sodium hydroxide, 2.31 grams of ethylenediamine tetraacetic acid and 2.0 grams of ferrous sulfate hepta hydrate in water made up to 100 ml.

It is understood that other recipes may be used for the polymerization of butadiene and styrene. An electrolyte may be present if desired, although it is preferred that it be omitted so as to further improve the properties of the latex for foamed rubber manufacture.

The first increment of the monomeric material may be polymerized in the presence of the surfactant and the polymerization catalyst until a portion has been converted to polymer and at least a portion of the unreacted monomeric material has been absorbed by the polymer particles. For example, prior to addition of an increment of monomeric material, about 20-70% and preferably about 50-65% by weight of the first increment may be polymerized to produce polymer. For best results, more than 50% by weight of the monomer should be converted to polymer before adding an additional increment.

An additional increment of monomeric material, which may be the same or a different monomer, may be added to the latex prepared by polymerization of the first increment. Preferably, the added monomeric material is the same as that used in the first increment. However, in instances where a copolymer is being prepared, only one of the monomers of the copolymer may be added if desired. The additional increment of monomeric material may be added in an amount whereby free monomeric material is present in the latex. Usually about 25-75% by weight of the first increment should be added, and preferably about 40-60% by weight. About 50% by weight often gives best results. The free monomeric material present in the latex as a result of adding the additional increment allows the formation of new small polymer particles with continued polymerization in the presence of free surfactant and the polymerization catalyst.

The latex produced by polymerization of the first increment is subjected to sufficiently vigorous agitation to cause agglomeration of polymer particles containing absorbed unreacted monomeric material to thereby produce a relatively large particle size latex and release free surfactant into the aqueous phase of the latex. The agitation may be effected during the polymerization of the first increment, and/or during or after adding the additional increment. In instances where vigorous agitation is continued after adding the increment of monomeric material, then it is terminated while the aqueous phase still contains free monomeric material. Usually that amount of agitation which results from subjecting the latex to the action of a radial agitator such as a propeller or impeller operating at a peripheral speed of about 800-4000 feet per minute, and preferably about 1000-1800 feet per minute, is satisfactory for vigorous agitation of the latex. For best results, the latex produced by polymerization of the first increment should be agglomerated until the average polymer particle size is at least 2000 angstroms, and then the additional increment of monomeric material may be added. It is also preferred to agitate the latex vigorously immediately after adding the increment of monomeric material to disperse it throughout the aqueous medium. The added monomeric material also aids in further agglomeration and, provided the vigorous agitation is terminated sufficiently early so that free monomeric material is still present in the aqueous medium, improved agglomeration may be obtained.

Following the vigorous agitation, the latex containing free added monomeric material may be subjected to further polymerization under relatively mild agitation conditions in the presence of free surfactant released by the agglomeration and the polymerization catalyst. The mild agitation allows additional small polymer particles to be produced and a substantial amount of additional agglomeration to produce a larger average particle size should not occur for best results. Thus, there may be a reduction in the average particle size of the latex during this phase of the polymerization. Examples of mild agitation are levels below that mentioned herein for vigorous agitation and especially that amount of agitation resulting from subjecting the latex to the action of a radial agitator operating at a peripheral speed substantially below 800 feet per minute, such as 50-500 feet per minute. The mild agitation may be continued for as long as desired to reach a given conversion of the monomeric material to polymer. In many instances, it it preferred that the vigorous agitation period extended for about ½-4 hours after the addition of the increment of monomer, and thereafter the resulting latex may be mildly agitated for about 1-4 hours in order to grow small polymer particles and thereby improve the packing factor.

The soap, water and electrolyte contents of the polymerization recipe preferably are maintained at or near minimum values. For instance, for best results the soap content should be about 1-3 parts by weight and for best results about 1-2 parts by weight for each 100 parts by weight of total monomeric material present in the first increment and added increments. Similarly, the water content should not exceed about 150 parts by weight and is preferably about 110-130 parts by weight for each 100 parts by weight of total monomeric material. Best results within the above range are usually obtained at about 120 parts by weight of water and 1.3 parts by weight of soap. An electrolyte should be omitted or kept at a minimum for best results.

More than one increment of monomer may be added when desired. For example, the first increment of monomer may be polymerized to a desired percent conversion, agitated to agglomerate the latex and release free surfactant into the aqueous phase, a further increment of monomer added and the polymerization allowed to continue, the resulting latex again agglomerated to a large average particle size to release additional surfactant into the aqueous phase, and a third increment of monomer added and the process repeated. However, usually addition of one monomer increment is sufficient and is preferred.

The hydrocarbon content of the latex solids may be very high when the soap content of the polymerization recipe is maintained at a minimum and may be as high as 96-98% by weight. It is usually preferred to prepare a low solids latex containing, for example, 15-25 to 30-40% solids, and then concentrate the low solids latex by prior art processes to a high solids content. The low solids latex may be concentrated by thermal evaporation of water, creaming, centrifuging or other suitable method to a high solids content of at least 55-60% and up to about 75-82%, without encountering prohibitive viscosities.

When operating in accordance with the present invention, the average particle size of the latex may be increased from about 800-900 angstroms to approximately 3000-5000 angstroms or higher. In instances where a second increment of monomer is not added to the latex and the reaction is terminated after polymerization of the first increment, then entirely satisfactory results are not obtained even when the average particle size is sufficiently large. The reaction rate is slow, only low conversions are possible, and the resulting latex does not have the unusually wide and uniform distribution of particle size in combination with an extremely large average particle size which is necessary for optimum results upon concentration to a high solids content. It is not possible to concentrate the latices of the prior art to a concentration above 75% by weight total solids, whereas it is possible to concentrate the latices of the present invention to over 82% by weight total solids.

The polymerization process of the invention may be practiced on either a batch or continuous scale. For instance, a single vessel may be used on a batch scale as illustrated in the examples, or a series of vessels may be arranged whereby the various steps of the present invention are effected continuously.

The polymerization temperatures may be in accordance with those of the prior art for the monomeric material being polymerized. For example, usually the polymerization temperature for preparing styrenebutadiene rubber is from about 40° F. up to about 125° F. but other satisfactory temperatures may be used.

At least a portion of the unreacted monomeric material remaining in the latex upon partial polymerization of the first increment is absorbed by the resulting polymer particles. The polymer particles may be swollen by the absorbed monomeric material and when in this condition they are especially easy to agglomerate to a relatively large average particle size latex. In instances where insufficient monomeric material is absorbed by the particles to render them soft and tacky, then more intense agitation results in the desired degree of agglomeration. Thus, it is understood that the intensity of agitation is such as to result in a desired amount of agglomeration without producing undue amounts of prefloc.

The foregoing detailed description and the following specific examples are for purposes of illustration only and are not intended as being limiting to the spirit or scope of the appended claims.

Example I

A half gallon glass laboratory reactor was fitted with a sawtooth blade impeller as an agitator and charged with the following polymerization recipe:

| Ingredient: | Parts by weight |
|---|---|
| Butadiene | 70.0 |
| Styrene | 30.0 |
| Potassium oleate | 2.0 |
| Diisopropyl benzene hydroperoxide | 0.05 |
| Activator solution [1] | 0.75 |
| Sodium formaldehyde sulfoxylate | 0.05 |
| Sulfole (tertiary dodecyl mercaptan) | 0.14 |
| Secondary emulsifier (sodium alkyl naphthalene sulfonate) | 0.1 |
| Tetrasodium salt of ethylenediamine tetraacetic acid | 0.01 |
| Sodium hydrosulfite | 0.026 |
| Water | 180.0 |

[1] The activator was a solution of 1.27 grams of sodium hydroxide, 2.31 grams of ethylenediamine tetraacetic acid and 2.0 grams of ferrous sulfate heptahydrate in water made up to 100 ml.

The polymerization ingredients were added to the reactor and the polymerization carried out at a temperature of 43° F. The sawtooth blade impeller used as the agitator had a diameter of 3 inches and was rotated at a speed of 1200 revolutions per minute to vigorously agitate the reactants.

The polymerization was continued under the above conditions until 60% of the initially charged monomer had reacted and was converted to polymer. The solid content of the resulting latex was 23% by weight. At this point, a second increment of monomers was added in the amount of 35 parts of butadiene and 15 parts of styrene. The vigorous agitation was continued at 1200 revolutions per minute for 4 hours after the second increment of monomers was added and then the agitator was reduced in speed to 600 revolutions per minute to provide mild agitation. The mild agitation rate was continued for four hours and the polymerization was terminated by shortstop addition. The total reaction time was 18 hours and the final conversion of monomer to polymer was 72% by weight based upon the initial charge of monomers. The unreacted monomer content was removed from the latex following prior art practice, i.e., the butadiene was flashed off and the styrene and a small amount of butadiene was removed by stream distillation under vacuum to produce stripped latex.

The resulting latex was found to have a 95% coverage and the average polymer particle size was 5000 angstroms. Portions of the latex were concentrated to various total solids contents by thermal evaporation of water.

The viscosity versus solids relationship was as follows:

| Percent solids (by weight): | Viscosity (centipoises) |
|---|---|
| 59.0 | 40 |
| 69 | 142 |
| 82.6 | 2500 |

The above latex was foamed, and the resulting foam had excellent properties for foamed rubber articles such as gelling characteristics, foam stability, low shrinkage and high compression resistance.

Example II

The general procedure outlined in Example I was followed in this example with the exception of changing the agitator speed from 1200 revolutions per minute to 600 revolutions per minute when the second increment of monomers was added.

The reaction was terminated at the end of a total reaction time of 24 hours, at which time 44% by weight of the initial charge of monomers had been converted to polymer. The resulting latex had a soap coverage of 94% and a particle size of 4550 angstroms.

Portions of the latex were concentrated by thermal evaporation to 56.2% and 69.6% total solids content. The viscosities at the two concentrations were determined and found to be only 55 centipoises and 590 centipoises, respectively.

When the addition of the second increment of monomers was omitted in the procedures of Examples I and II, the resulting latices were not comparable to those produced in accordance with the process of the invention as illustrated by Examples I and II. The particle size and distribution of particle size was not such so as to produce an extremely low viscosity, high solids latex upon concentration, the reaction rate was much slower, and it was not possible to reach a satisfactory percent final conversion of the monomers. Thus, the addition of a second increment of the monomers in combination with vigorous agitation to agglomerate the latex followed by a period of mild agitation to grow small particles, is necessary in order to obtain all of the benefits of the invention.

What is claimed is:

1. In a process for preparing synthetic rubbery polymer latex by emulsion polymerization including the step of polymerizing ethylenically unsaturated monomeric material which produces latex of a synthetic rubbery polymer upon polymerization while dispersed in an aqueous medium in the presence of a micelle producing surfactant for the emulsion polymerization of the said monomeric material and a polymerization catalyst therefor, the said monomeric material being at least one substance selected from the group consisting of chloroprene, conjugated diolefins homopolymerizable to produce rubbery polymers and mixtures of conjugated diolefins and monoethylenically unsaturated monomers copolymerizable therewith to produce rubbery copolymers, said mixtures containing up to 50% by weight of the monoethylenically unsaturated monomer, the improvement which comprises:

(a) polymerizing a first increment of the said monomeric material in the presence of the surfactant and the polymerization catalyst until a portion of the said first increment of monomeric material has been converted to polymer and unreacted monomeric material has been absorbed by the polymer particles, (b) subjecting the resulting latex to sufficiently vigorous agitation to cause agglomeration of polymer particles containing absorbed unreacted monomeric material to thereby produce a relatively large average polymer particle size and release free surfactant into the aqueous phase of the latex, the latex being agglomerated by agitation with a radial agitator operating at a peripheral speed of about 800–4000 feet per minute, (c) adding at least one additional increment of the said monomeric material to the latex, the additional increment of the said monomeric material having about the same monomeric composition as the said first increment and being added in an amount whereby free monomeric material is present in the latex and new polymer particles are formed with continued polymerization in the presence of free surfactant and the polymerization catalyst, and (d) subjecting the latex containing the said free added monomeric material to further polymerization in the presence of free surfactant and the polymerization catalyst under relatively mild agitation conditions to thereby produce additional small polymer particles in the latex.

2. The synthetic rubbery polymer latex prepared by the process of claim 1.

3. The process of claim 1 wherein the monomeric material is a mixture of styrene and butadiene containing up to about 50% by weight of styrene.

4. The process of claim 1 wherein a low solids latex is prepared and then concentrated to a high solids content of at least 60% by weight.

5. The high solids synthetic rubbery polymer latex prepared by the process of claim 4.

6. In a process for preparing synthetic rubbery polymer latex by emulsion polymerization including the step of polymerizing ethylenically unsaturated monomeric material which produces latex of a synthetic rubbery polymer upon polymerization while dispersed in an aqueous medium in the presence of a micelle producing surfactant for the emulsion polymerization of the said monomeric material and a free radical initiator as a polymerization catalyst therefor, the monomeric material being at least one substance selected from the group consisting of chloroprene, conjugated diolefins homopolymerizable to produce rubbery polymers and mixtures of conjugated diolefins and monoethylenically unsaturated monomers copolymerizable therewith to produce rubbery copolymers, said mixtures containing up to 50% by weight of the monoethylenically unsaturated monomer, the improvement which comprises:
  (a) polymerizing a first increment of the said monomeric material in the presence of the surfactant and the polymerization catalyst until about 20–70% by weight has been converted to rubbery polymer and unreacted monomeric material has been absorbed by the polymer particles to produce swollen polymer particles in the resulting latex,
  (b) the said first increment of monomeric material while initially at about 20–70% by weight conversion being subjected to sufficiently vigorous agitation to cause agglomeration of the swollen polymer particles and thereby produce a relatively large average particle size and release free surfactant into the aqueous phase of the latex, the latex being agglomerated by agitation with a radial agitator operating at a peripheral speed of about 800–4000 feet per minute,
  (c) adding at least one additional increment of the said monomeric material to the agglomerated latex containing free surfactant, the additional increment of the said monomeric material having about the same monomeric composition as the said first increment and being added in an amount of about 25–75% by weight of the said first increment whereby free monomeric material is present in the agglomerated latex and new rubbery polymer particles are formed with continued polymerization in the presence of the said free surfactant and the polymerization catalyst, and
  (d) subjecting agglomerated latex containing the said free added monomeric material to further polymerization in the presence of the free surfactant and the polymerization catalyst under relatively mild agitation conditions whereby a substantial amount of further agglomeration of the latex particles does not occur to thereby produce additional small polymer particles in the latex.

7. The process of claim 6 wherein the monomeric material is a mixture of styrene and butadiene containing up to about 50% by weight of styrene.

8. In a process for preparing latex by emulsion polymerization including the step of copolymerizing ethylenically unsaturated monomeric material while dispersed in an aqueous medium in the presence of a micelle producing surfactant for the emulsion polymerization of the said monomeric material and a polymerization catalyst, therefor, the monomeric material being a copolymerizable mixture of styrene and butadiene containing up to about 50% by weight of styrene, the improvement which comprises:
  (a) copolymerizing a first increment of the said monomeric material in the presence of the surfactant and the polymerization catalyst until a portion of the said first increment of monomeric material has been converted to polymer and unreacted monomeric material has been absorbed by the polymer particles,
  (b) subjecting the latex to sufficiently vigorous agitation to cause agglomeration of polymer particles containing absorbed unreacted monomeric material to thereby produce a relatively large average particle size and release free surfactant into the aqueous phase of the latex, the latex being agglomerated by agitation with a radial agitator operating at a peripheral speed of about 800–4000 feet per minute,
  (c) adding at least one additional increment of the said monomeric material to the latex, the additional increment of the said monomeric material having about the same monomeric composition as the said first increment and being added in an amount whereby free monomeric material is present in the latex and new polymer particles are formed with continued polymerization in the presence of free surfactant and the polymerization catalyst, and
  (d) subjecting latex containing the said free added monomeric material to further polymerization in the presence of free surfactant and the polymerization catalyst under relatively mild agitation conditions to thereby produce additional small polymer particles in the latex,
  (e) the aqueous emulsion containing not more than three parts by weight of the surfactant and not more than 150 parts by weight of water based on the total weight of the first increment and the said additional increment of monomeric material.

9. The latex of the copolymer of styrene and butadiene prepared by the process of claim 8.

10. The process of claim 8 wherein a low solids latex is prepared and then concentrated to a high solids content of at least 60% by weight.

11. The high solids latex of the copolymer of styrene and butadiene prepared by the process of claim 10.

12. In a process for preparing latex by emulsion polymerization including the step of copolymerizing ethylenically unsaturated monomeric material while dispersed in an aqueous medium in the presence of a micelle producing surfactant for the emulsion polymerization of the said monomeric material and a free radical initiator as a polymerization catalyst therefor, the monomeric material being a copolymerizable mixture of styrene and butadiene containing up to about 50% by weight of styrene, the improvement which comprises:
  (a) copolymerizing a first increment of the said monomeric material in the presence of the surfactant and the polymerization catalyst until about 20–70% by weight has been converted to polymer and unreacted monomeric material has been absorbed by the polymer particles to produce swollen polymer particles in the resulting latex,
  (b) the said first increment of monomeric material while initially at about 20–70% by weight conversion being subjected to sufficiently vigorous agitation to cause agglomeration of the swollen polymer particles and thereby produce a relatively large average particle size and release free surfactant into the aqueous phase of the latex, the latex being agglomerated by agitation with a radial agitator operating at a peripheral speed of about 800–4000 feet per minute, (c) adding at least one additional increment of the said monomeric material to the agglomerated latex containing free surfactant which has substantially the same composition as the said first increment of monomeric material, the additional increment of the said monomeric material being added in an amount of about 25–75% by weight of the first increment whereby free monomeric material is present in the agglomerated latex and new polymer particles are formed with continued polymerization in the presence of the said free surfactant and the polymerization catalyst, and (d) subjecting agglomerated latex containing the said free added monomeric material to further polymerization in the presence of the free surfactant and the polymerization catalyst under relatively mild agitation conditions whereby a substantial amount of further agglomeration of the latex particles does not occur to thereby produce additional small polymer particles in the latex, (e) the aqueous emulsion containing about 1–3 parts by weight of the surfactant and about 100–150 parts by weight of water based on the total weight of the first increment and the said second increment of monomeric material.

13. The process of claim 12 wherein the surfactant includes a substance selected from the group consisting of water soluble soaps of micelle-forming carboxylic acids, water soluble micelle-foming alkali metal sulfonates, and micelle-forming non-ionic surfactants and the latex.

14. The process of claim 13 wherein the surfactant includes potassium oleate the aqueous emulsion contains about 1–2 parts by weight of the surfactant, the latex is agglomerated to an average polymer particle size of at least 2000 angstroms prior to adding the said additional increment of monomeric material, and the latex is agglomerated by agitation with a radial agitator operating at a peripheral speed of about 800–4000 feet per minute for about ½–4 hours after addition of the said additional increment of monomeric material and then the latex is subjected to the said mild agitation conditions.

15. The process of claim 14 wherein the additional increment of monomeric material is added in an amount of about 50% by weight of the first increment, the additional increment is added when more than 50% by weight and not more than 65% by weight of the first increment of monomeric material has been converted to polymer, the radial agitator is operated at a peripheral speed of about 1000–1800 feet per minute when agglomerating the latex, the aqueous emulsion contains about 120 parts by weight of water based on the total weight of the first increment and the said second increment of monomeric material and the aqueous emulsion is substantially free of an electrolyte.

References Cited by the Examiner

UNITED STATES PATENTS

| | | | |
|---|---|---|---|
| 2,745,818 | 5/1956 | Te Grotenhuis | 260—880 |
| 3,080,334 | 3/1963 | Kolaczewski et al. | 260—29.7 |

MURRAY TILLMAN, *Primary Examiner.*

GEORGE F. LESMES, *Examiner.*

J. T. GOOLKASIAN, J. ZIEGLER, *Assistant Examiners.*

UNITED STATES PATENT OFFICE
CERTIFICATE OF CORRECTION

Patent No. 3,318,831  May 9, 1967

Kjetil Gauslaa

It is hereby certified that error appears in the above numbered patent requiring correction and that the said Letters Patent should read as corrected below.

Column 11, lines 30 and 31, strike out "and the latex".

Signed and sealed this 6th day of May 1969.

(SEAL)
Attest:

Edward M. Fletcher, Jr.
Attesting Officer

Commissioner of Patents